June 20, 1933.    C. W. MARTIN    1,914,518
WELDING APPARATUS
Filed Feb. 9, 1932    2 Sheets-Sheet 1

INVENTOR.
CHARLES W. MARTIN.
BY Victor J. Evans Co
ATTORNEYS.

June 20, 1933.    C. W. MARTIN    1,914,518
WELDING APPARATUS
Filed Feb. 9, 1932    2 Sheets-Sheet 2
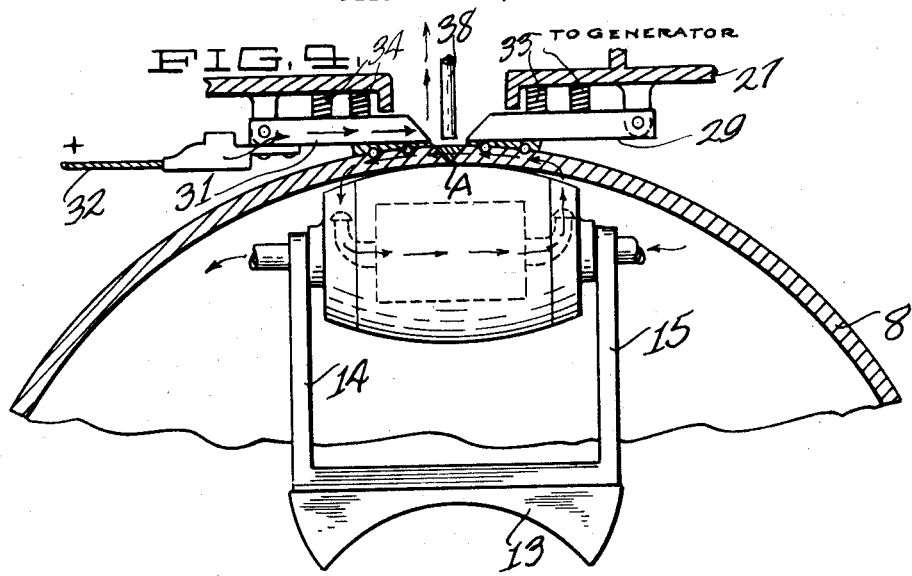
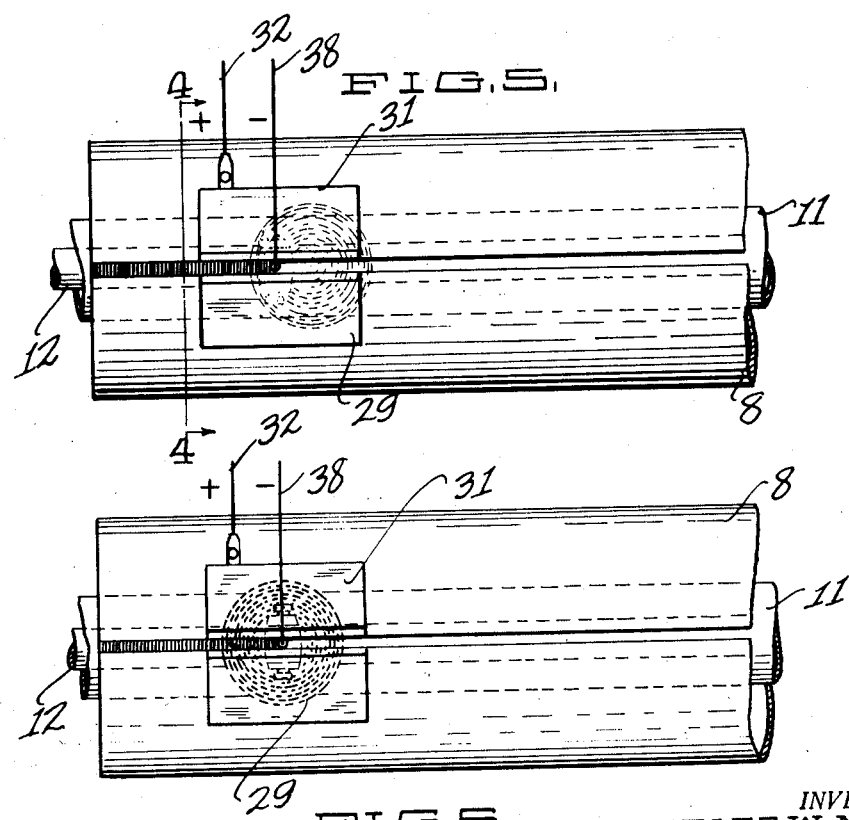
INVENTOR.
CHARLES W. MARTIN
BY
ATTORNEYS.

Patented June 20, 1933

1,914,518

UNITED STATES PATENT OFFICE

CHARLES WARREN MARTIN, OF HUNTINGTON PARK, CALIFORNIA

WELDING APPARATUS

Application filed February 9, 1932. Serial No. 591,864.

This invention relates to improvements in welding apparatus and has particular reference to means for welding pipe or other similar structures wherein a longitudinal weld is made between two parallel pieces of metal.

The principal object of the invention is to provide means whereby the magnetic flux is maintained centrally around the arc, thus preventing blowing of the arc.

A further object is to produce a device which is capable of continuous operation.

A still further object is to produce a device which will function on pipes of various sizes.

Other objects and advantages will be apparent during the course of the following description.

Figure 1:
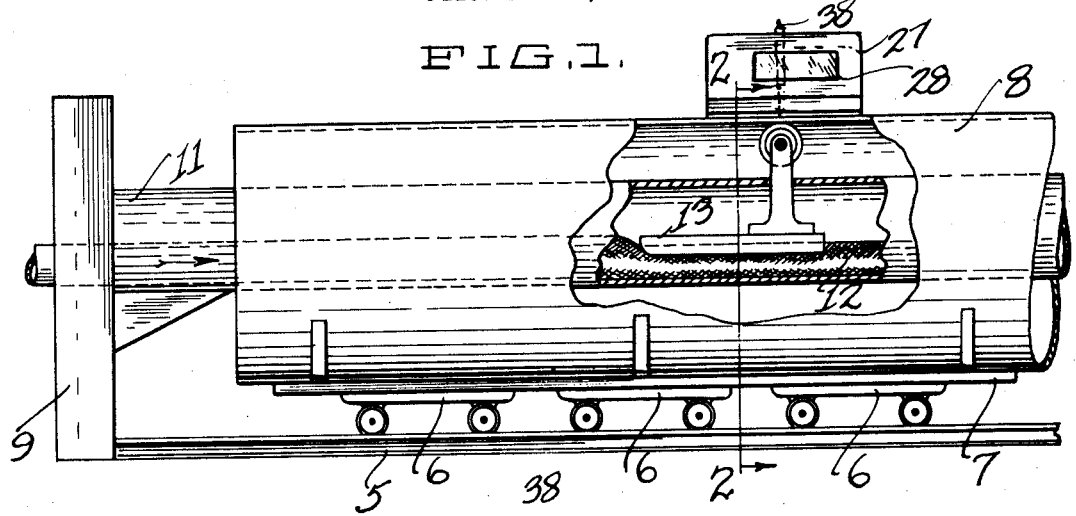
Figure 2:
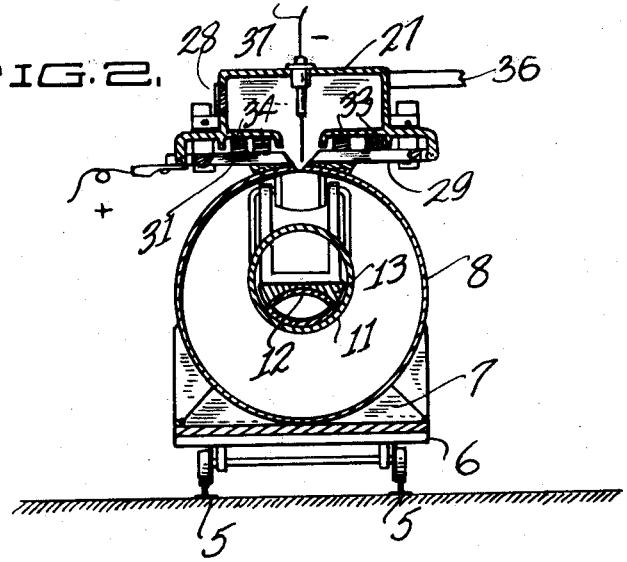
Figure 3:
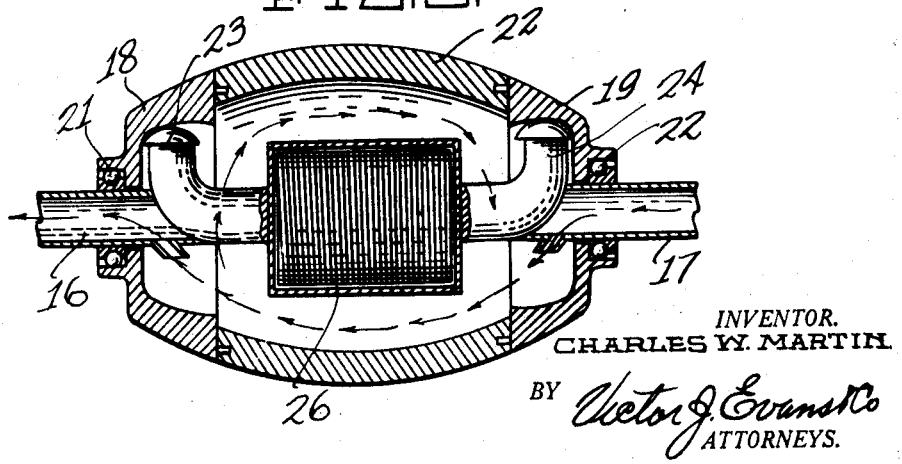

In the accompanying drawings forming a part of this specification and in which like numerals are employed to designate like parts throughout the same, Fig. 1 is a side elevation of my device, showing a portion thereof broken away in order to better illustrate the general scheme, Fig. 2 is a cross sectional view taken on the line 2—2 of Fig. 1, Fig. 3 is an enlarged cross sectional view of the back-up shoe, Fig. 4 is an enlarged detail cross sectional view showing the back-up member and jaws, Fig. 5 is a diagrammatic view showing the manner in which the magnetic flux will travel away from the axis of the arc when my device is not used, and Fig. 6 is a diagrammatic view illustrating in circular dotted lines the manner in which the magnetic flux is centralized with relation to the arc when my device is used.

In the accompanying drawings wherein for the purpose of illustration is shown a preferred embodiment of my invention, and referring to Fig. 1, the numeral 5 designates tracks upon which trucks 6 may roll. These trucks may be of any desired number and support a cradle 7 upon which the material to be welded is positioned. In the present instance I have shown a large diameter pipe 8 having abutting edges as shown at A (see Fig. 4). These abutting edges are the ones to be welded. At 9 I have shown a support which support has extending outwardly therefrom a hollow mandrel 11. This mandrel is preferably arranged in practice so that it can be raised or lowered upon the support 9. The manner of raising or lowering has been purposely omitted so as to avoid confusion. Mounted within the mandrel 11 is a flexible hose 12 upon which rests a base plate 13, carrying upstanding arms 14 and 15, at the upper ends of which is supported pipes 16 and 17 respectively. The purpose of these pipes will be later seen.

Rotatably mounted upon these pipes 16 and 17 is a back-up member which consists of end plates 18 and 19 rotating on ball bearings 21 and 22 respectively and having extending therebetween a curved plate which with the end pieces 18 and 19 forms a watertight enclosure. It is of course understood that stuffing boxes are employed where the pipes 16 and 17 extend through the end pieces 18 and 19. Secured to the pipes 16 and 17 is an electromagnet having bent pole pieces 23 and 24, which pole pieces extend upwardly or toward the work to be welded, see Fig. 4. Current, to the winding 26 of the electromagnet, is lead through the pipe 16 and is properly insulated so as not to be effected by the water passing through this pipe. The pipes 16 and 17 are attached to a water supply pipe and water discharge pipe so that water may be circulated, indicated by the arrows in Fig. 3, for the purpose of keeping the back-up member cool. These supply and discharge pipes extend through the hollow mandrel 11.

Mounted exteriorly of the pipe 8 is a clamping arrangement consisting of a box 27 having a viewing window 28, which housing has supported therebelow, clamping members 29 and 31. One of these clamping members is connected to the positive wire 32 of any suitable electric source of supply. These clamping plates 29 and 31 are forced against the pipe 8 by springs 33 and 34 respectively. The box 27 is supported above the pipe 8 in any convenient manner as indicated by the arm 36. An insulator 37 extends through the housing 27 and the welding wire 38 is fed through this insulator and is connected to the negative side of the line. It is obvious that proper feeding means are provided for controlling the feeding of this wire as well as the amount of current that is supplied thereto.

From this construction it will be apparent that a pipe of any size may be supported upon a suitable cradle and moved over the mandrel 11 so that the abutting edges of the pipe to be welded will lie beneath the welding box 27. The supporting arm 36 will then be lowered until the clamping plates 29 and 31 engage the opposite sides of the joint with sufficient pressure to make a good electrical contact. Ball bearings are preferably provided in the bottom of the clamping members 29 and 31 so as to prevent friction as the welding operation progresses and the pipe is moved with respect to the welding apparatus. Air is now admitted to the hose 12 which expands and in expanding will force the supports 14 and 15 together with the back-up member upwardly against the under-surface of the joint and at a point directly beneath where the weld is to take place. As this back-up member is mounted upon the roller bearings it will be apparent that the pipe being welded may be rolled thereover with a minimum amount of resistance. If the current is now turned on so as to cause an arc to be formed by the wire 38 and the joint, a weld will take place. However, this weld will not be confined to the area immediately below the welding wire. In other words the arc formed would be liable to blow due to many causes, such as the magnetic effect surrounding the welding wire, impurities in the iron, etc. By now turning on the current to my electromagnet an entirely different action will take place in that the arc will be confined to the center of the magnetic field created by an electromagnet and therefore, there will be no tendency of the arc to leave its proper place and as a result a much better and more uniform weld may be accomplished. At the same time the material being worked upon may be gradually advanced as the weld progresses.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a support, a mandrel carried by said support, means for moving an article to be welded over said mandrel, a base plate carried by said mandrel, supports extending upwardly from said base plate, means for raising said base plate with respect to said mandrel, a rotatable back-up member carried by said supports, means for cooling said back-up member, and an electromagnet mounted in said back-up member whereby a magnetic flux will be directed toward the object being welded in the manner described.

2. In a device of the character described, a support, a mandrel carried by said support, means for moving an article to be welded over said mandrel, a base plate carried by said mandrel, supports extending upwardly from said base plate, means for raising said base plate with respect to said mandrel, a rotatable back-up member carried by said supports, means for cooling said back-up member, an electromagnet mounted in said back-up member whereby a magnetic flux will be directed toward the object being welded, a welding box positioned above the article to be welded, said welding box having a pair of clamping members pivotally supported thereon, resilient means engaging said clamps whereby said clamps will be held in engagement with the article being welded.

In testimony whereof I affix my signature.

CHARLES WARREN MARTIN.